(12) United States Patent
Lee et al.

(10) Patent No.: US 12,319,128 B2
(45) Date of Patent: Jun. 3, 2025

(54) VEHICULAR HEAT MANAGEMENT SYSTEM

(71) Applicant: Hanon Systems, Daejeon (KR)

(72) Inventors: Jun Min Lee, Daejeon (KR); Chul Hee Kim, Daejeon (KR); Seon Ung Youn, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 399 days.

(21) Appl. No.: 17/781,856

(22) PCT Filed: Dec. 28, 2020

(86) PCT No.: PCT/KR2020/019180
§ 371 (c)(1),
(2) Date: Jun. 2, 2022

(87) PCT Pub. No.: WO2021/133134
PCT Pub. Date: Jul. 1, 2021

(65) Prior Publication Data
US 2023/0020602 A1 Jan. 19, 2023

(30) Foreign Application Priority Data

Dec. 27, 2019 (KR) .......... 10-2019-0176458
Dec. 28, 2020 (KR) .......... 10-2020-0184195

(51) Int. Cl.
B60H 1/32 (2006.01)
B60H 1/00 (2006.01)

(52) U.S. Cl.
CPC ....... *B60H 1/3213* (2013.01); *B60H 1/00007* (2013.01)

(58) Field of Classification Search
CPC .......... B60H 1/32; B60H 1/00; B60H 1/3213; B60H 1/00278; B60H 1/00921; B60H 1/00885; B60H 1/00007; B60H 2001/00307; B60H 2001/3285; F25B 30/06

See application file for complete search history.

(56) References Cited

U.S. PATENT DOCUMENTS

2017/0361677 A1* 12/2017 Kim .................... H01M 10/663

FOREIGN PATENT DOCUMENTS

JP         5310323 B2    10/2013
KR     20160087001 A     7/2016

(Continued)

*Primary Examiner* — Harry E Arant
(74) *Attorney, Agent, or Firm* — NORTON ROSE FULBRIGHT US LLP

(57) ABSTRACT

A vehicular heat management system includes: a heat pump type refrigerant circulation line including a compressor, a high-pressure side indoor heat exchanger, a heat pump mode variable expansion valve, an outdoor heat exchanger, an air conditioner mode variable expansion valve, and a low-pressure side indoor heat exchanger; a cooling water circulation line configured to circulate cooling water between a radiator and a specific cooling target; and a refrigerant-cooling water chiller configured to allow the refrigerant in the refrigerant circulation line transferred from the outdoor heat exchanger to the low-pressure side indoor heat exchanger to exchange heat with the cooling water in the cooling water circulation line circulated through the specific cooling target.

17 Claims, 14 Drawing Sheets

(56) References Cited

FOREIGN PATENT DOCUMENTS

| KR | 1020170094015 A | * | 8/2017 |
| KR | 20190036091 A | | 4/2019 |
| KR | 20190057768 A | | 5/2019 |

* cited by examiner

VEHICULAR HEAT MANAGEMENT SYSTEM

TECHNICAL FIELD

The present invention relates to a vehicular heat management system and, more particularly, to a vehicular heat management system capable of effectively managing refrigerant/cooling water flow paths and heat energy through the control of a refrigerant/cooling water chiller and refrigerant/cooling water flows, improving the cooling/heating performance without additional energy consumption, and consequently achieving the improvement of cooling/heating performance in a passenger compartment and the improvement of fuel economy.

BACKGROUND ART

Examples of an eco-friendly vehicle include an electric vehicle, a hybrid vehicle and a fuel cell vehicle (hereinafter collectively referred to as "vehicle").

Such a vehicle is equipped with various heat management devices. For example, as shown in FIG. 1, the heat management devices include an air conditioner 10 for cooling and heating a passenger compartment, a water-cooling device for cooling a specific cooling target 20 of a vehicle by water-cooling, and a water-cooling device 30 for cooling electric components such as, for example, a battery, an electric component module, and the like.

The air conditioner 10 is of a heat pump type and is provided with a refrigerant circulation line 12. The refrigerant circulation line 12 includes a compressor 12a, a high-pressure side indoor heat exchanger 12b, a heat pump mode variable expansion valve 12c, an outdoor heat exchanger 12d, an air conditioner mode variable expansion valve 12e, and a low-pressure side indoor heat exchanger 12f.

In an air conditioner mode, the refrigerant circulation line 12 opens the heat pump mode variable expansion valve 12c, so that the refrigerant can be circulated without being depressurized and expanded by the heat pump mode variable expansion valve 12c. Through this refrigerant circulation, a low-temperature cold air is generated in the low-pressure side indoor heat exchanger 12f. The cold air thus generated is supplied into the passenger compartment to cool the passenger compartment.

In the heat pump mode, the heat pump mode variable expansion valve 12c is turned on so that the refrigerant can be circulated while being depressurized and expanded by the heat pump mode variable expansion valve 12c. High-temperature heat is generated in the high-pressure-side indoor heat exchanger 12b through this refrigerant circulation. The heat thus generated is supplied into the passenger compartment to heat the passenger compartment.

The water-cooling device 30 uses the refrigerant of the air conditioner 10 to cool a specific cooling target 20, for example, a battery. The water-cooling device 30 includes a water-cooling device expansion valve configured to introduce and expand the refrigerant of the air conditioner 10, a chiller 34 configured to generate a cold air by introducing the refrigerant of the water-cooling device expansion valve 32, and a cooling water circulation line 36 configured to deliver the cold air generated in the chiller 34 to electric components such as, for example, a battery and the like.

In particular, the cooling water circulation line 36 circulates cooling water between the chiller 34 and the specific cooling target 20. Accordingly, the cold air generated in the chiller 34 is delivered to the specific cooling target 20 to cool the specific cooling target 20.

Meanwhile, in such a vehicular heat management system, it is an important task to effectively control and manage the flow paths of the refrigerant and cooling water and the heat energy, thereby improving the cooling and heating performance without additional energy consumption.

In particular, it is a very important task to improve the cooling and heating performance of the air conditioner 10 without energy consumption and consequently improve the cooling and heating effect for the passenger compartment without increasing the fuel consumption of a vehicle.

SUMMARY

In view of the problems inherent in the related art, it is an object of the present invention to provide a vehicular heat management system capable of effectively controlling and managing refrigerant/cooling water flow paths and heat energy and improving the cooling/heating performance without additional energy consumption.

Another object of the present invention is to provide a vehicular heat management system capable of achieving the improvement of cooling/heating performance in a passenger compartment and the improvement of fuel economy.

In order to achieve these objects, there is provided a vehicular heat management system, comprising: a heat pump type refrigerant circulation line including a compressor, a high-pressure side indoor heat exchanger, a heat pump mode variable expansion valve, an outdoor heat exchanger, an air conditioner mode variable expansion valve, and a low-pressure side indoor heat exchanger; a cooling water circulation line configured to circulate cooling water between a radiator and a specific cooling target; and a refrigerant-cooling water chiller configured to allow the refrigerant in the refrigerant circulation line transferred from the outdoor heat exchanger to the low-pressure side indoor heat exchanger to exchange heat with the cooling water in the cooling water circulation line circulated through the specific cooling target.

In the system, the refrigerant-cooling water chiller may be configured to, in a passenger compartment cooling mode, allow the refrigerant in the refrigerant circulation line introduced from the outdoor heat exchanger into the low-pressure side indoor heat exchanger to exchange heat with the cooling water in the cooling water circulation line having a lower temperature than the refrigerant to additionally lower the temperature of the refrigerant introduced into the low-pressure side indoor heat exchanger.

The system may further comprises: a variable expansion valve installed on the upstream side of the refrigerant-cooling water chiller, wherein the variable expansion valve may be configured to, when the temperature of the specific cooling target is increased to a preset temperature or more in the passenger compartment cooling mode, depressurize and expand the refrigerant introduced into the refrigerant-cooling water chiller, so that a low-temperature cold air is generated in the refrigerant-cooling water chiller and is delivered to the specific cooling target through the cooling water in the cooling water circulation line to cool the specific cooling target.

The system may further comprise: a bypass line and a bypass valve configured to, in a passenger compartment heating mode, directly bypass the refrigerant in the refrigerant circulation line discharged from the refrigerant-cooling water chiller toward an inlet of the compressor, wherein the refrigerant-cooling water chiller may be configured to, in the passenger compartment heating mode, allow the refrigerant in the refrigerant circulation line introduced into the compressor through the bypass line and the bypass valve to exchange heat with the cooling water in the cooling water circulation line that has adsorbed waste heat of the specific cooling target, so that the refrigerant in the refrigerant circulation line introduced into the compressor recovers the waste heat of the specific cooling target.

The system may further comprise: a refrigerant-cooling water flow control part configured to, depending on an air conditioner mode state, control a flow of the refrigerant in the refrigerant circulation line and a flow of the cooling water in the cooling water circulation line with respect to the refrigerant-cooling water chiller.

In the system, the refrigerant-cooling water flow control part may include a plurality of refrigerant circulation line side flow control valves installed in the refrigerant circulation line on the upstream side of the refrigerant-cooling water chiller with the refrigerant-cooling water chiller interposed therebetween, a bypass valve installed on the bypass line, and a cooling water circulation line side flow control valve installed in the cooling water circulation line on the downstream side of the specific cooling target.

According to the vehicular heat management system of the present invention, in the passenger compartment cooling mode, the high-temperature refrigerant in the refrigerant circulation line introduced to the low-pressure side indoor heat exchanger and the low-temperature cooling water in the cooling water circulation line are caused to exchange heat with each other through the refrigerant-cooling water chiller. Therefore, in the passenger compartment cooling mode, it is possible to further lower the temperature of the refrigerant introduced to the low-pressure side indoor heat exchanger, whereby the cooling efficiency of the low-pressure side indoor heat exchanger can be improved.

In addition, in the passenger compartment heating mode, the low-temperature refrigerant in the refrigerant circulation line introduced to the compressor and the cooling water in the cooling water circulation line that has absorbed waste heat from the battery and electric component module are caused to exchange heat with each other through the refrigerant-cooling water chiller. Therefore, in the passenger compartment heating mode, the refrigerant introduced into the compressor can recover the waste heat of the battery and the electric component module, whereby the refrigerant compression efficiency at the compressor side can be improved and the heat pump mode efficiency can be improved.

In addition, the cooling efficiency of the low-pressure indoor heat exchanger and the heat pump mode efficiency are improved through the effective heat energy management of the refrigerant and the cooling water using the refrigerant-cooling water chiller. Therefore, it is possible to improve the passenger compartment cooling/heating performance without additional energy consumption.

In addition, by adopting the configuration in which the passenger compartment cooling/eating performance can be improved without energy consumption, it is possible to achieve the improvement of the passenger compartment cooling/heating performance and the improvement of the fuel consumption of the vehicle.

DETAILED DESCRIPTION

Figure 1:
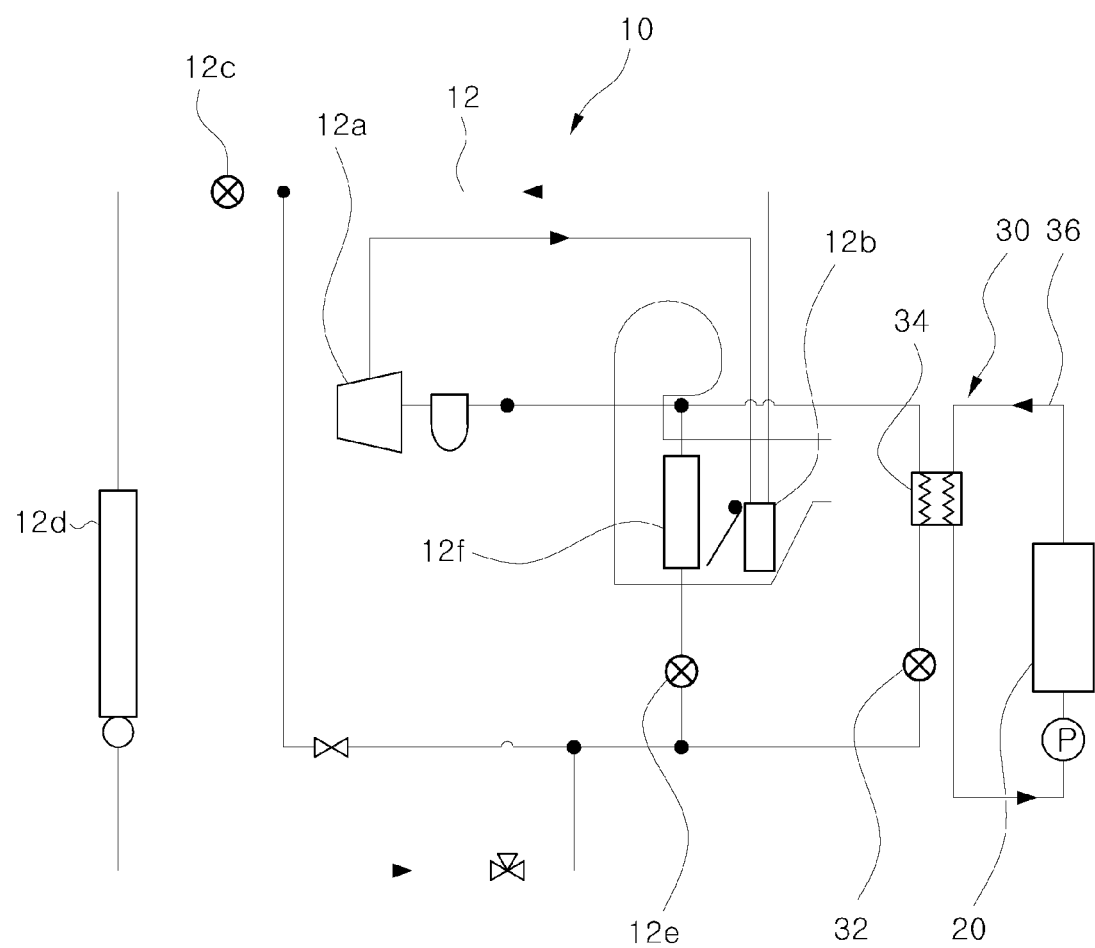
FIG. 1 is a view showing a conventional vehicular heat management system.

Preferred embodiments of a vehicular heat management system according to the present invention will now be described in detail with reference to the accompanying drawings.

Prior to describing the features of the vehicular heat management system according to the present invention, the general configurations of the vehicular heat management system will be briefly described with reference to FIG. 2.

The vehicular heat management system includes an air conditioner 10 for cooling and heating a passenger compartment, and a water-cooling device 40 for cooling a specific cooling target 20 of a vehicle, for example, an electric component such as a battery 22, an electric component module 24 or the like.

The air conditioner 10 is of a heat pump type and includes a refrigerant circulation line 12. The refrigerant circulation line 12 includes a compressor 12a, a high-pressure side indoor heat exchanger 12b, a heat pump mode variable expansion valve 12c, an outdoor heat exchanger 12d, an air conditioner mode variable expansion valve 12e, and a low-pressure side indoor heat exchanger 12f.

In an air conditioner mode, the refrigerant circulation line 12 opens the heat pump mode variable expansion valve 12c to generate a low-temperature cold air in the low-pressure side indoor heat exchanger 12f. The cold air thus generated is supplied into the passenger compartment to cool the passenger compartment.

In the heat pump mode, the heat pump mode variable expansion valve 12c is turned on to generate high-temperature heat in the high-pressure-side indoor heat exchanger 12b. The heat thus generated is supplied into the passenger compartment to heat the passenger compartment.

The water-cooling device 40 includes a cooling water circulation line 42 and a radiator 44 and causes cooling water to circulate between the radiator 44 and the specific cooling target 20, for example, the battery 22 or the electric component module 24.

Therefore, the waste heat of the battery 22 and the electric component module 24 is absorbed by the cooling water, the waste heat absorbed by the cooling water is dissipated through the radiator 44, and the battery 22 and the electric component module 24 are cooled through the heat absorption and heat dissipation action of the cooling water.

Next, features of the vehicular heat management system according to the present invention will be described in detail with reference to FIGS. 2 to 14.

Figure 2:
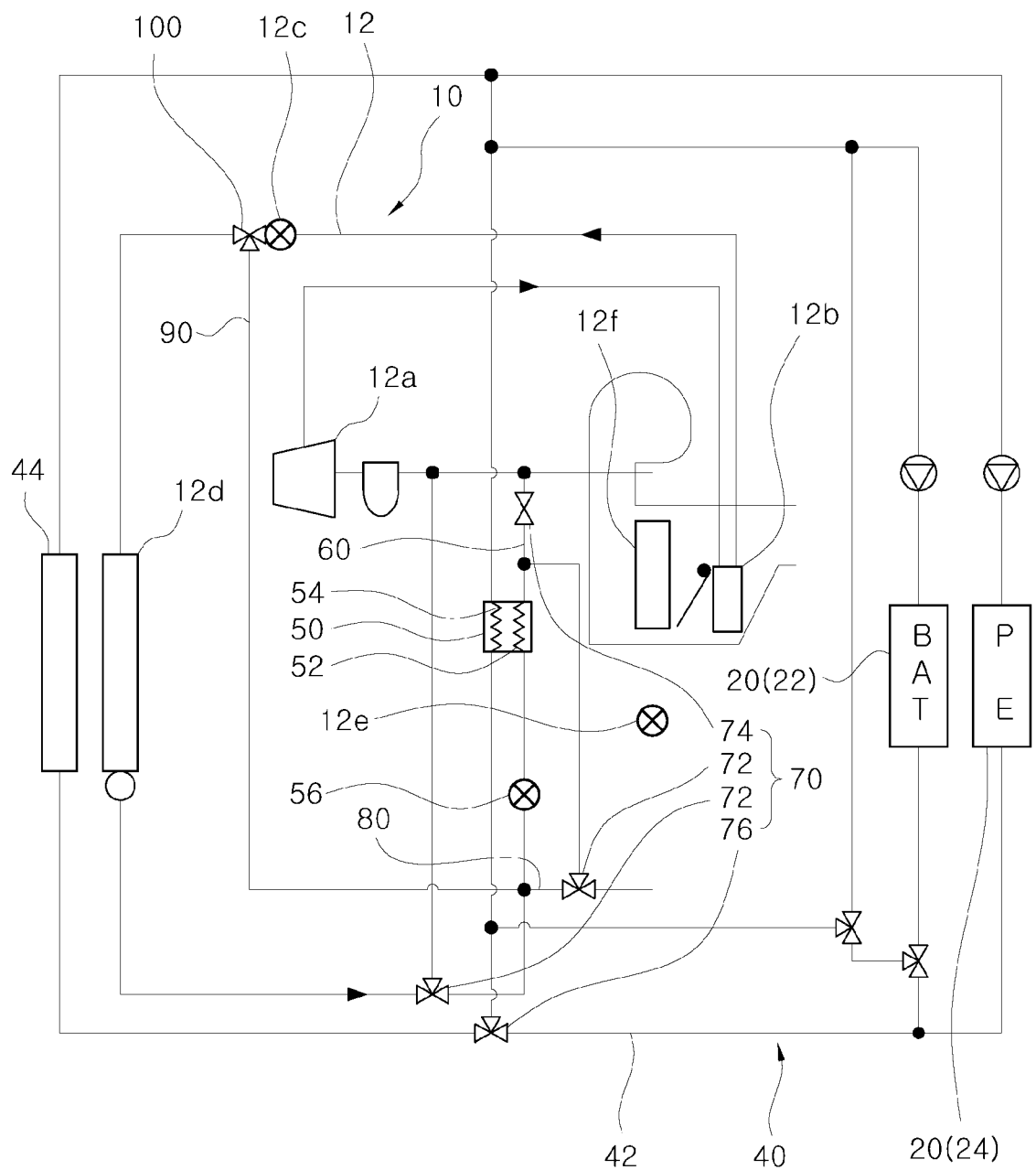
FIG. 2 is a view showing a vehicular heat management system according to the present invention.

Referring first to FIG. 2, the vehicular heat management system of the present invention further includes a refrigerant-cooling water chiller 50 capable of causing the refrigerant in the refrigerant circulation line 12 transferred from the outdoor heat exchanger 12d to the low-pressure side indoor heat exchanger 12f to exchange heat with the cooling water in the cooling water circulation line 42 passed through the specific cooling target 20.

The refrigerant-cooling water chiller 50 includes a first internal flow path 52 into which the refrigerant in the refrigerant circulation line 12 can be introduced to pass therethrough, and a second internal flow path 54 into which the cooling water in the cooling water circulation line 42 can be introduced to pass therethrough.

The first and second internal flow paths 52 and 54 are formed to correspond to each other and are configured to cause the refrigerant in the refrigerant circulation line 12 transferred from the outdoor heat exchanger 12d to the low-pressure side indoor heat exchanger 12f to exchange heat with the cooling water in the cooling water circulation line 42.

Figure 3:
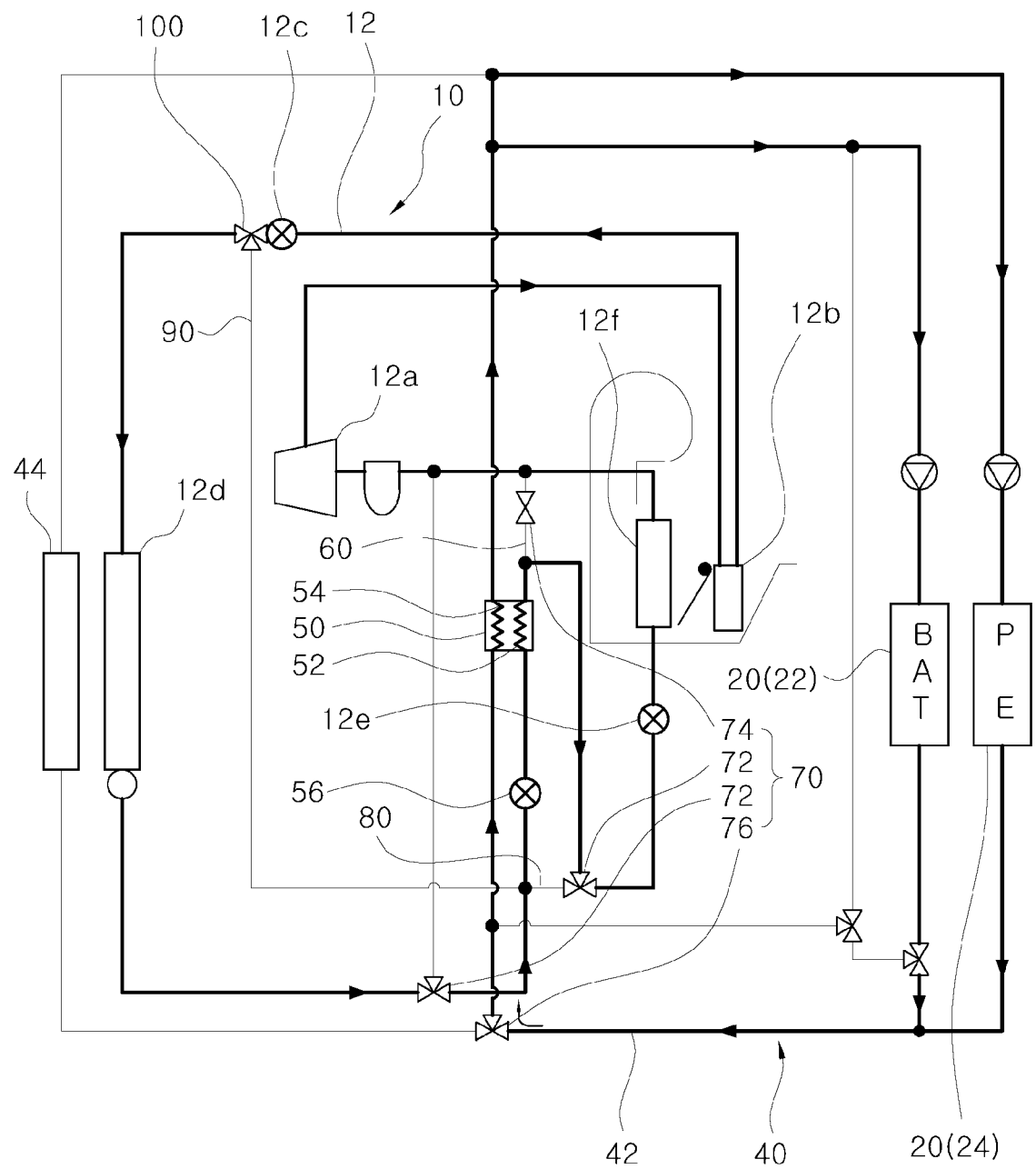
FIG. 3 is an operation diagram of the vehicular heat management system according to the present invention, showing a state in which a refrigerant-cooling water chiller of the present invention cools the refrigerant introduced into a low-pressure side indoor heat exchanger in a passenger compartment cooling mode.

In particular, as shown in FIG. 3, in the passenger compartment cooling mode, the high-temperature refrigerant in the refrigerant circulation line 12 transferred from the outdoor heat exchanger 12d to the low-pressure side indoor heat exchanger 12f is caused to exchange heat with the cooling water in the cooling water circulation line 42 having a lower temperature than the refrigerant.

Accordingly, the temperature of the refrigerant introduced into the low-pressure side indoor heat exchanger 12f can be lowered. Thus, the temperature of the refrigerant introduced into the low-pressure side indoor heat exchanger 12f is further lowered to overcool the refrigerant. As a result, the cooling efficiency of the low-pressure side indoor heat exchanger 12f is improved.

Consequently, the refrigerant-cooling water chiller 50 serves as an auxiliary condenser that, in the passenger compartment cooling mode, further lowers the temperature of the refrigerant whose temperature has been lowered on the side of the outdoor heat exchanger. The role as the auxiliary condenser improves the cooling performance of the air conditioner 10.

In particular, it is possible to improve the cooling performance of the air conditioner 10 without additional energy consumption. Therefore, it is possible to improve both the passenger compartment cooling/heating performance and the vehicle fuel efficiency.

Meanwhile, a variable expansion valve 56 is installed on the upstream side of the refrigerant-cooling water chiller 50.

The variable expansion valve 56 depressurizes and expands the refrigerant introduced into the refrigerant-cooling water chiller 50 when the temperature of the specific cooling target 20, for example, the battery 22 rises to above a preset temperature.

Accordingly, the refrigerant-cooling water chiller 50 can generate a low-temperature cold air. The generated cold air can be delivered to the battery 22 through the cooling water in the cooling water circulation line 42, thereby cooling the battery 22.

Referring again to FIG. 2, the vehicular heat management system of the present invention further includes a bypass line 60 capable of bypassing the refrigerant discharged from the first internal flow path 52 of the refrigerant-cooling water chiller 50 toward the inlet side of the compressor 12a.

Figure 4:
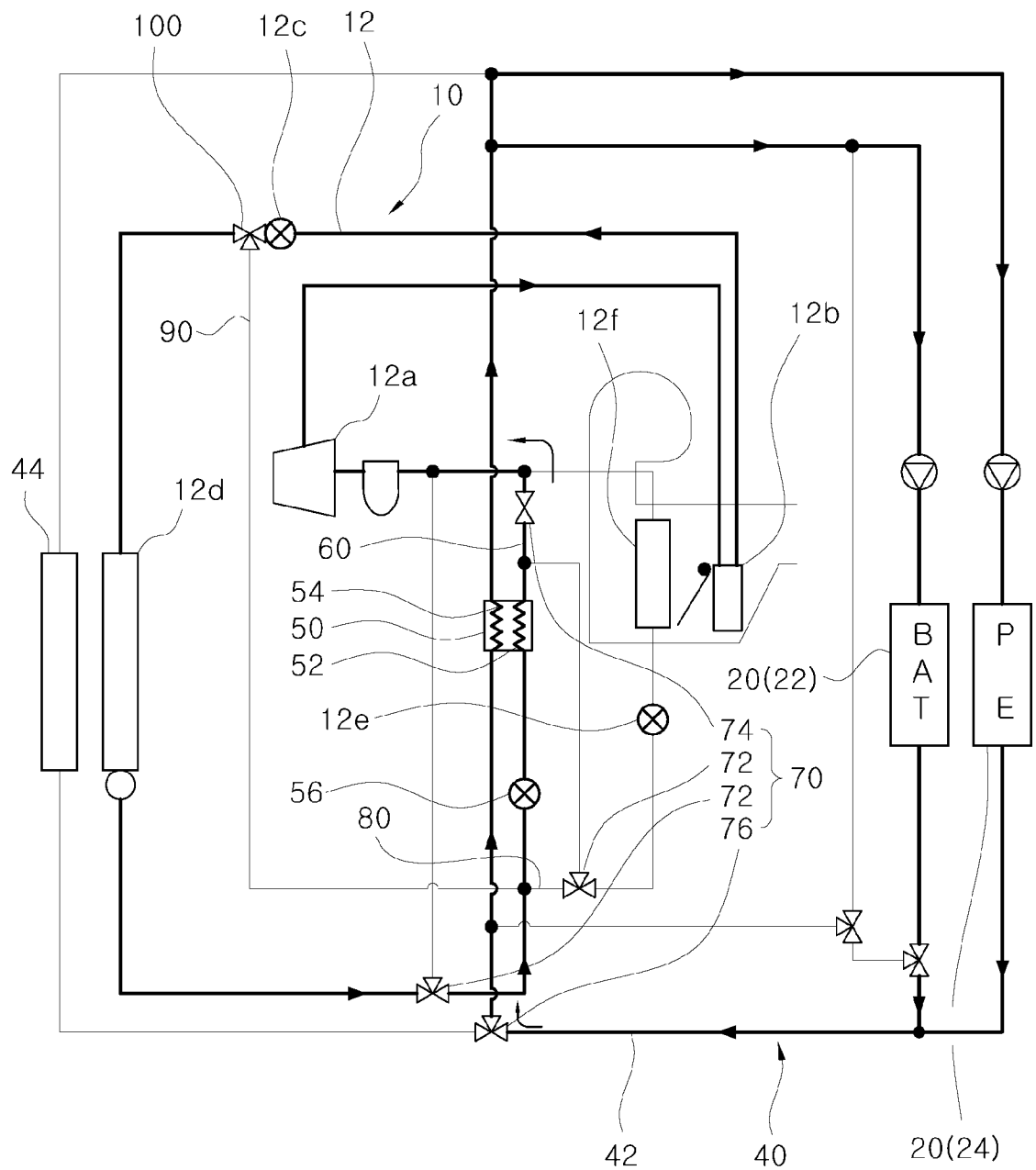
FIG. 4 is an operation diagram of the vehicular heat management system according to the present invention, showing a state in which the refrigerant-cooling water chiller of the present invention recovers waste heat by delivering the waste heat of a battery and an electric component module to the refrigerant introduced into a compressor in the passenger compartment heating mode.

As shown in FIG. 4, in the passenger compartment cooling mode, the bypass line 60 bypasses the refrigerant in the first internal flow path 52 of the refrigerant-cooling water chiller 50 heat-exchanged with the cooling water in the cooling water circulation line 42 toward the inlet of the compressor 12a.

In particular, in the passenger compartment heating mode, the temperature of the refrigerant in the first internal flow path 52 of the refrigerant-cooling water chiller 50 is kept lower than the temperature of the cooling water in the second internal flow path 54 on the side of the cooling water circulation line 42 that has absorbed the waste heat of the battery 22 and the electric component module 24. Therefore, in the refrigerant-cooling water chiller 50, the refrigerant in the first internal flow path 52 absorbs the waste heat of the cooling water in the second internal flow path 54. The refrigerant that has absorbed the waste heat of the cooling water in this way is bypassed toward the inlet of the compressor 12a.

Accordingly, the refrigerant that has absorbed the waste heat of the cooling water returns to the compressor 12a while undergoing an increase in temperature, thereby increasing the refrigerant compression efficiency at the compressor 12a and improving the heat pump mode efficiency.

As a result, in the passenger compartment heating mode, the bypass line 60 and the refrigerant-cooling water chiller 50 return the refrigerant from the outdoor heat exchanger 12d to the compressor 12a. The refrigerant can be heated while recovering the waste heat generated by the battery 22 and the electric component module 24. The heated refrigerant can increase the heat pump mode efficiency of the air conditioner 10 to improve the passenger compartment heating performance.

Figure 6:
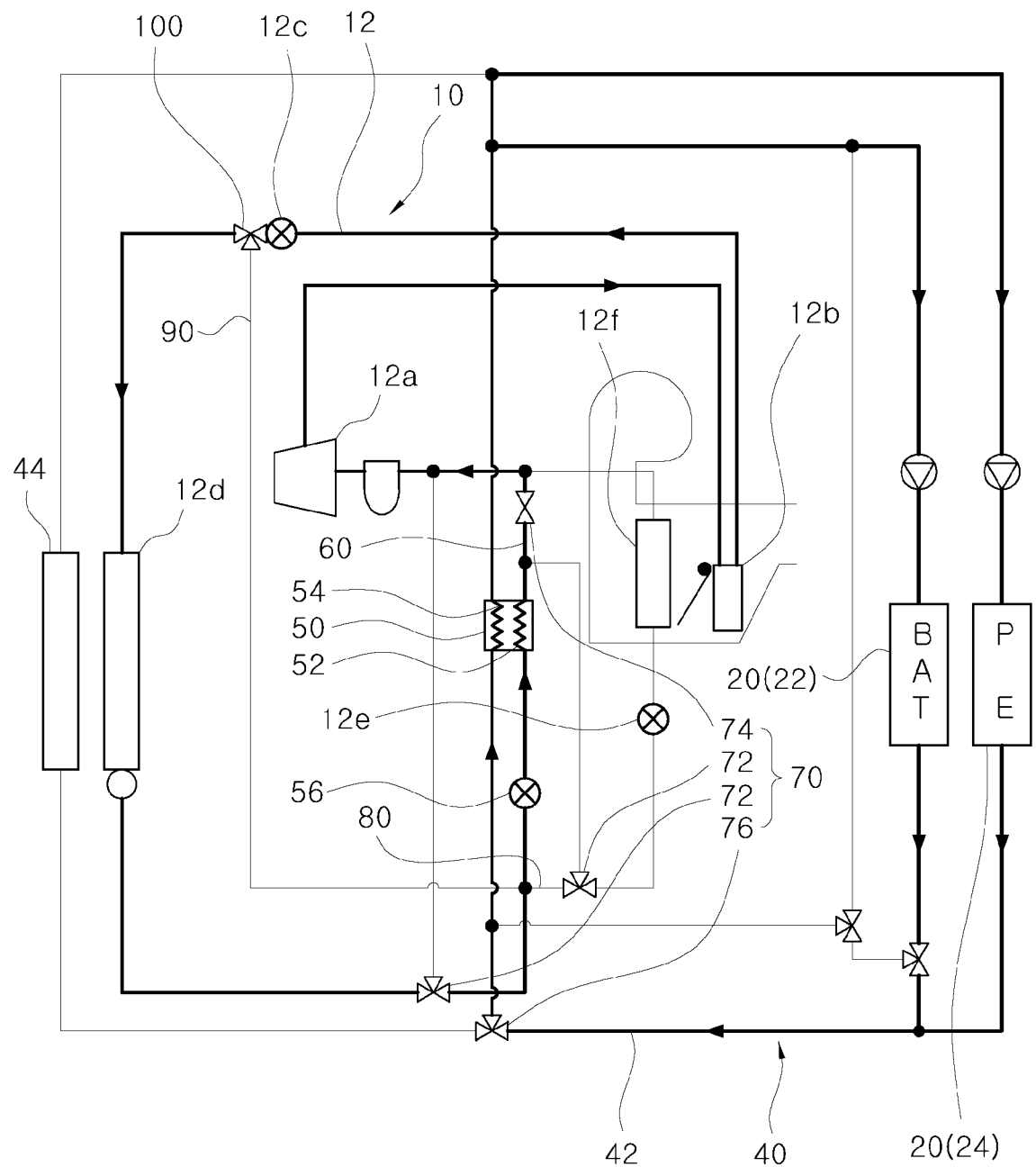
FIG. 6 is an operation diagram of the vehicular heat management system according to the present invention, showing the circulation of the refrigerant in the refrigerant circulation line and the circulation of the cooling water in the cooling water circulation line when entering only a battery/electric component module cooling mode.

Meanwhile, as shown in FIG. 6, when entering only the cooling mode of the specific cooling target 20, the bypass line 60 also bypasses the refrigerant in the first internal flow path 52 of the refrigerant-cooling water chiller 50 heat-exchanged with the cooling water in the cooling water circulation line 42 toward the inlet of the compressor 12a.

Referring again to FIG. 2, the vehicular heat management system of the present invention further includes a refrigerant-cooling water flow control part 70 for controlling the flow of the refrigerant in the refrigerant circulation line 12 and the flow of the cooling water in the cooling water circulation line 42 for the refrigerant-cooling water chiller 50 depending on the state of the air conditioner mode.

The refrigerant-cooling water flow control part 70 includes refrigerant circulation line side flow control valves 72 installed in the refrigerant circulation line 12 on the upstream and downstream sides of the refrigerant-cooling water chiller 50 with the refrigerant-cooling water chiller 50 interposed therebetween, a bypass valve 74 installed in the bypass line 60, and a cooling water circulation line side flow control valve 76 installed in the cooling water circulation line 42 on the downstream side of the battery 22 and the electric component module 24.

The refrigerant-cooling water flow control part 70 executes control so that, in the passenger compartment cooling mode, as shown in FIG. 3, the refrigerant in the refrigerant circulation line 12 discharged from the outdoor heat exchanger 12d can be introduced into the low-pressure side indoor heat exchanger 12f through the first internal flow path 52 of the refrigerant-cooling water chiller 50 and the cooling water in the cooling water circulation line 42 passing through the battery 22 and the electric component module 24 can be circulated to the second internal flow path 54 of the refrigerant-cooling water chiller 50.

Accordingly, in the passenger compartment cooling mode, the refrigerant in the refrigerant circulation line 12 and the cooling water in the cooling water circulation line 42 can exchange heat with each other in the refrigerant-cooling water chiller 50.

In the course of the mutual heat exchange between the refrigerant and the cooling water, the temperature of the refrigerant introduced into the low-pressure side indoor heat exchanger 12f can be further lowered to improve the cooling performance of the low-pressure side indoor heat exchanger 12f, or the temperature of the cooling water introduced into the battery 22 and the electric component module 24 can be lowered to cool the battery 22 and the electric component module 24.

In addition, the refrigerant-cooling water flow control part 70 executes control so that, in the passenger compartment heating mode, as shown in FIG. 4, the refrigerant in the refrigerant circulation line 12 discharged from the outdoor heat exchanger 12d can be bypassed toward the compressor 12a through the first internal flow path 52 of the refrigerant-cooling water chiller 50 and the cooling water in the cooling water circulation line 42 that has absorbed the waste heat of the battery 22 and the electric component module 24 can be circulated to the second internal flow path 54 of the refrigerant-cooling water chiller 50.

Accordingly, in the passenger compartment heating mode, the refrigerant in the refrigerant circulation line 12 and the cooling water in the cooling water circulation line 42 exchange heat with each other in the refrigerant-cooling water chiller 50.

In the process of the mutual heat exchange between the refrigerant and the cooling water, the refrigerant returning to the compressor 12a recovers the waste heat of the battery 22 and the electric component module 24, thereby enhancing the heat pump mode efficiency of the air conditioner 10.

Figure 5:
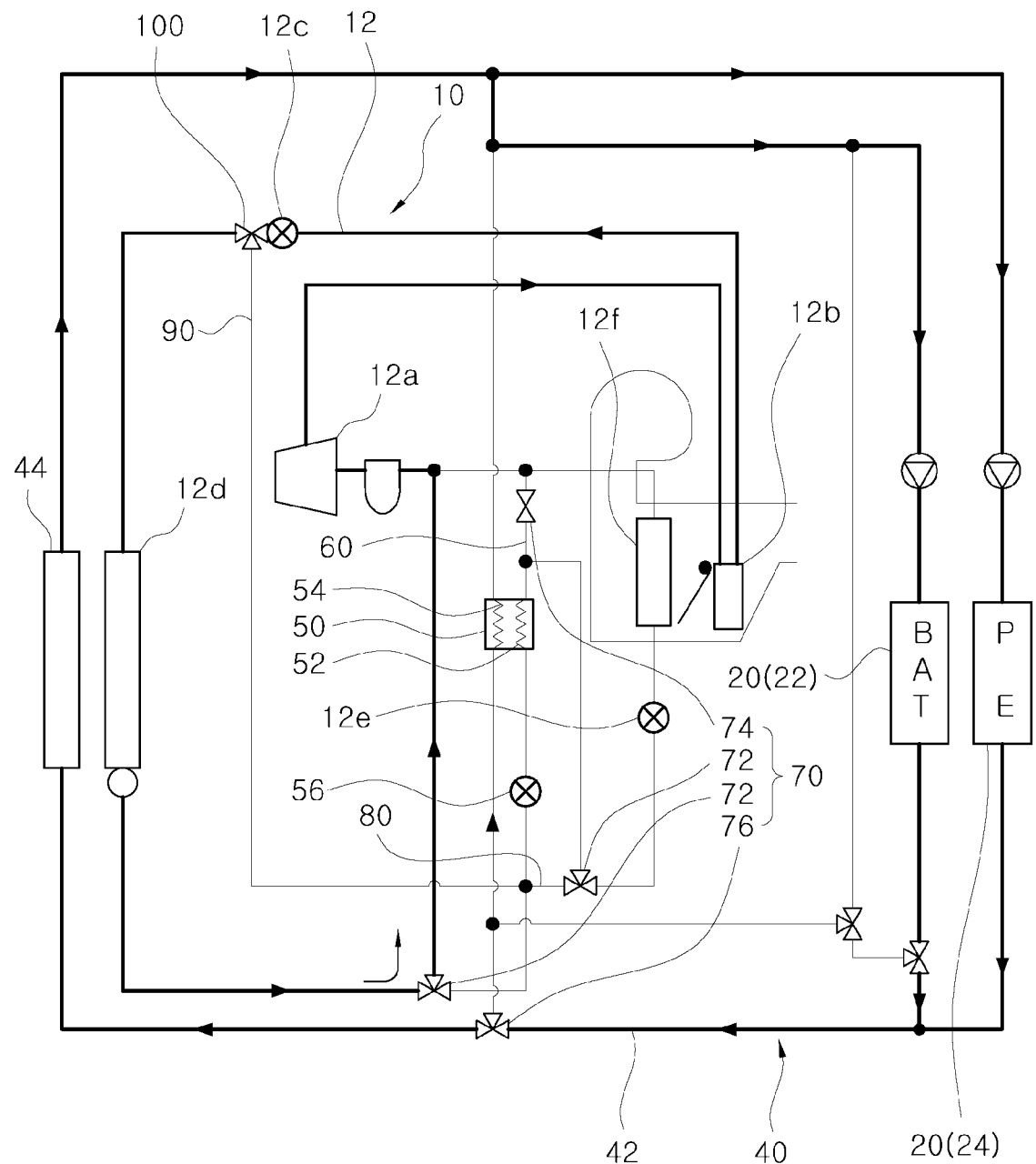
FIG. 5 is an operation diagram of the vehicular heat management system according to the present invention, showing a state in which the cooling water in the cooling water circulation line that has absorbed the waste heat of the battery and the electric component module is circulated toward the radiator in the passenger compartment heating mode.

Further, when the temperature of the waste heat of the battery 22 and the electric component module 24 is lower than a preset temperature in the passenger compartment heating mode, as shown in FIG. 5, the refrigerant-cooling water flow control part 70 executes control so that the refrigerant in the refrigerant circulation line 12 discharged from the outdoor heat exchanger 12d can be directly introduced into the compressor 12a and the cooling water in the cooling water circulation line 42 on the side of the battery 22 and the electric component module 24 can be circulated toward the radiator 44.

Therefore, in the passenger compartment heating mode, under the condition that the waste heat temperature of the battery 22 and the electronic component module 24 is low, the refrigerant on the side of the outdoor heat exchanger 12d can return directly to the compressor 12a without recovering the waste heat of the battery 22 and the electric component module 24, and the cooling water in the cooling water circulation line 42 that has passed through the battery 22 and the electric component module 24 can be cooled while circulating the radiator 44.

In addition, when entering only the specific cooling target cooling mode, as shown in FIG. 6, the refrigerant-cooling water flow control part 70 executes control so that the refrigerant in the refrigerant circulation line 12 discharged from the outdoor heat exchanger 12d can be bypassed to the compressor 12a through the first internal flow path 52 of the refrigerant-cooling water chiller 50, and the cooling water in the cooling water circulation line 42 that has absorbed the waste heat of the battery 22 and the electric component module 24 can be circulated to the second internal flow path 54 of the refrigerant-cooling water chiller 50.

Accordingly, when entering only the specific cooling target cooling mode, the low-temperature refrigerant in the refrigerant circulation line 12 and the cooling water in the cooling water circulation line 42 can exchange heat with each other in the refrigerant-cooling water chiller 50.

In the process of the mutual heat exchange between the refrigerant and the cooling water, the cooling water circulated toward the specific cooling target 20 can cool the specific cooling target 20 while maintaining a low temperature.

Referring again to FIG. 2, the refrigerant-cooling water flow control part 70 further includes a connection line 80 branched from the refrigerant circulation line 12 on the upstream side of the refrigerant-cooling water chiller 50 and connected to the refrigerant circulation line side flow control valve 72 on the downstream side of the refrigerant-cooling water chiller 50.

The connection line 80 introduces a part or the entirety of the refrigerant on the upstream side of the refrigerant-cooling water chiller 50 to the low-pressure side indoor heat exchanger 12f under the control of the refrigerant circulation line side flow control valve 72.

In particular, depending on the state of the air conditioner mode, a part or the entirety of the refrigerant discharged from the outdoor heat exchanger 12d is introduced into the low-pressure side indoor heat exchanger 12f under the control of the refrigerant-cooling water flow control part 70.

Therefore, depending on the state of the air conditioning mode, the refrigerant discharged from the outdoor heat exchanger 12d can be introduced into the low-pressure side indoor heat exchanger 12f, or can be introduced into both the refrigerant-cooling water chiller 50 and the low-pressure side indoor heat exchanger 12f.

Figure 7:
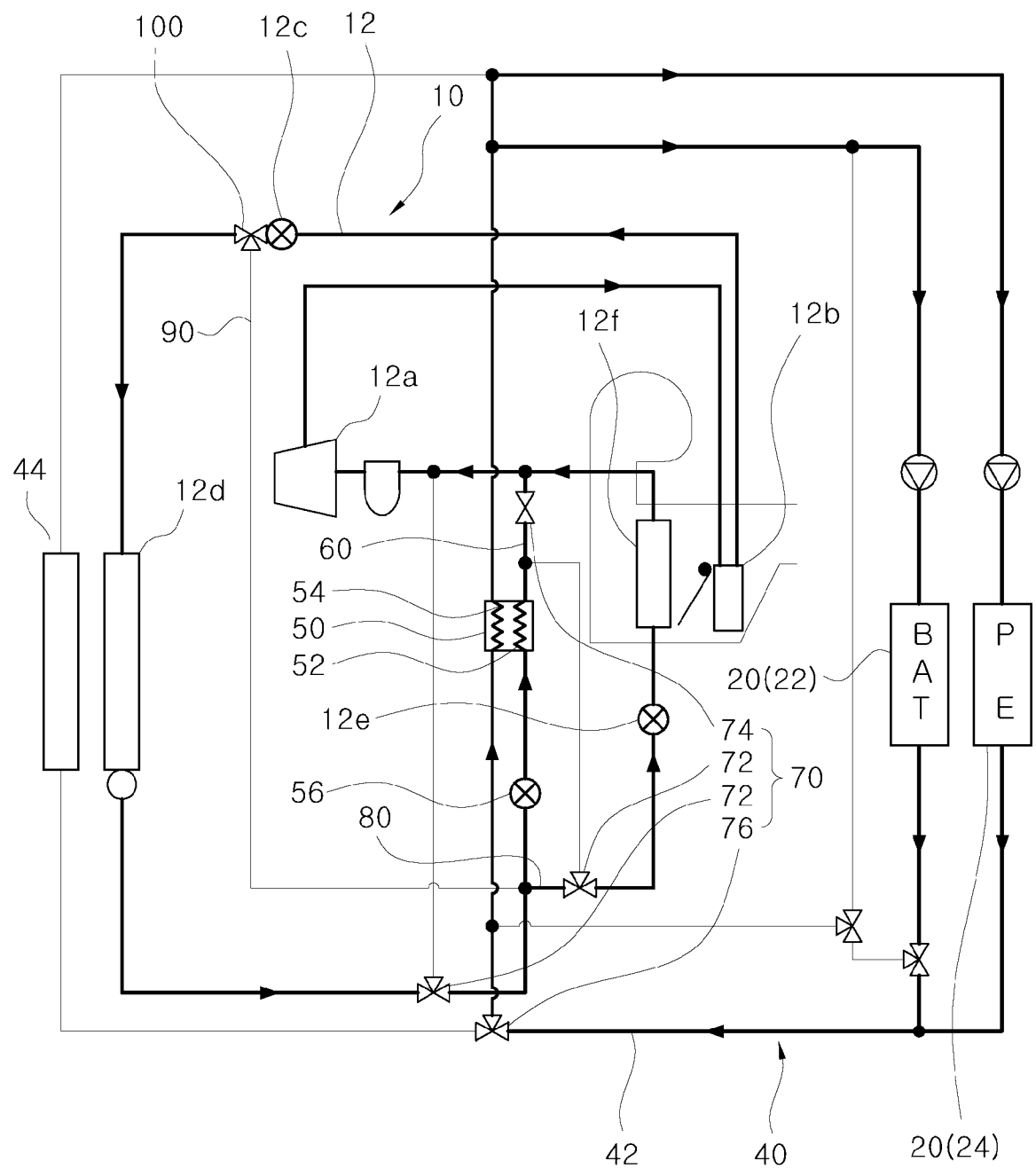
FIG. 7 is an operation diagram of the vehicular heat management system according to the present invention, showing the circulation of the refrigerant in the refrigerant circulation line and the circulation of the cooling water in the cooling water circulation line when entering a battery/electric component module cooling mode under a passenger compartment cooling mode condition.

For example, as shown in FIG. 7, when entering the specific cooling target cooling mode under the passenger compartment cooling mode condition, the refrigerant in the refrigerant circulation line 12 discharged from the outdoor heat exchanger 12d can be introduced into both the first internal flow path 52 of the refrigerant-cooling water chiller 50 and the low-pressure side indoor heat exchanger 12f.

In addition, the refrigerant-cooling water flow control part 70 executes control so that the cooling water in the cooling water circulation line 42 that has absorbed the waste heat of the specific cooling target 20, for example, the battery 22 or the electric component module 24 can be circulated to the second internal flow path 54 of the refrigerant-cooling water chiller 50.

Therefore, when entering the specific cooling target cooling mode under the passenger compartment cooling mode condition, a cool air can be generated in the low-pressure side indoor heat exchanger 12f to cool the passenger compartment, and the low-temperature refrigerant in the refrigerant circulation line 12 and the cooling water in the cooling water circulation line 42 can exchange heat with each other in the refrigerant-cooling water chiller 50.

In the process of the mutual heat exchange between the refrigerant and the cooling water, the cooling water circulated to the specific cooling target 20 can cool the specific cooling target 20 while maintaining a low temperature.

Referring again to FIG. 2, the refrigerant-cooling water flow control part 70 further includes a branch line 90 branched from the refrigerant circulation line 12 on the downstream side of the heat pump mode variable expansion valve 12c and connected to the branch point of the connection line 80 on the refrigerant circulation line 12 on the upstream side of the refrigerant-cooling water chiller 50.

The branch line 90 allows the refrigerant that has passed through the heat pump mode variable expansion valve 12c to be introduced into the refrigerant-cooling water chiller 50 and the low-pressure side indoor heat exchanger 12f.

In particular, the refrigerant depressurized and expanded by the heat pump mode variable expansion valve 12c can be introduced into the refrigerant-cooling water chiller 50 and the low-pressure side indoor heat exchanger 12f.

Meanwhile, a three-way flow control valve 100 is installed at the branch point of the branch line 90 on the downstream side of the heat pump mode variable expansion valve 12c.

The three-way flow control valve 100 is integrally formed with the upstream heat pump mode variable expansion valve 12c and is provided with a function of an expansion valve. The three-way flow control valve 100 allows the refrigerant depressurized and expanded by the heat pump mode variable expansion valve 12c to be introduced into at least one of the outdoor heat exchanger 12d and the branch line 90.

In particular, depending on the state of the air conditioner mode, the three-way flow control valve 100 cooperates with each of the valves 72, 74 and 76 of the refrigerant-cooling water flow control part 70 to allow the refrigerant depressurized and expanded by the heat pump mode variable expansion valve 12c to be introduced into at least one of the outdoor heat exchanger 12d, the refrigerant-cooling water chiller 50 and the low-pressure side indoor heat exchanger 12f.

Figure 8:
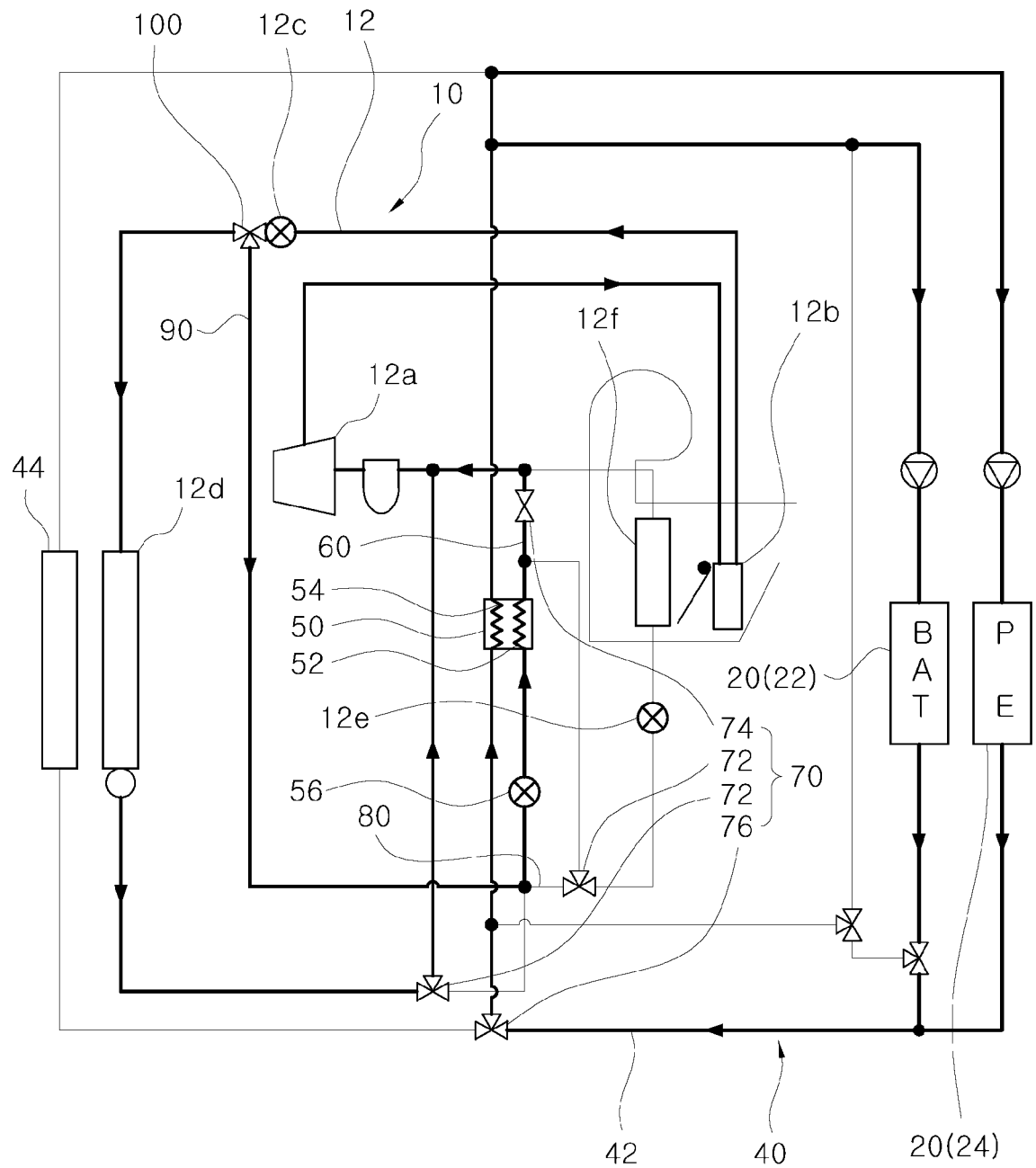
FIG. 8 is an operation diagram of the vehicular heat management system according to the present invention, showing the circulation of the refrigerant in the refrigerant circulation line and the circulation of the cooling water in the cooling water circulation line in a passenger compartment heating mode.

For example, as shown in FIG. 8, in the passenger compartment heating mode, the refrigerant depressurized and expanded by the heat pump mode variable expansion valve 12c is introduced into both the outdoor heat exchanger 12d and the first internal flow path 52 of the refrigerant-cooling water chiller 50.

In addition, the cooling water in the cooling water circulation line 42 that has absorbed the waste heat of the battery 22 and the electric component module 24 can be circulated through the second internal flow path 54 of the refrigerant-cooling water chiller 50.

Accordingly, in the passenger compartment heating mode, the refrigerant depressurized and expanded by the heat pump mode variable expansion valve 12c can be directly introduced into the compressor 12a through the outdoor heat exchanger 12d. The refrigerant in the refrigerant circulation line 12 and the cooling water in the cooling water circulation line 42 can exchange heat with each other in the refrigerant-cooling water chiller 50.

In the process of the mutual heat exchange between the refrigerant and the cooling water, the refrigerant returning to the compressor 12a can recover the waste heat of the battery 22 and the electric component module 24, thereby enhancing the heat pump mode efficiency of the air conditioner 10.

Figure 9:
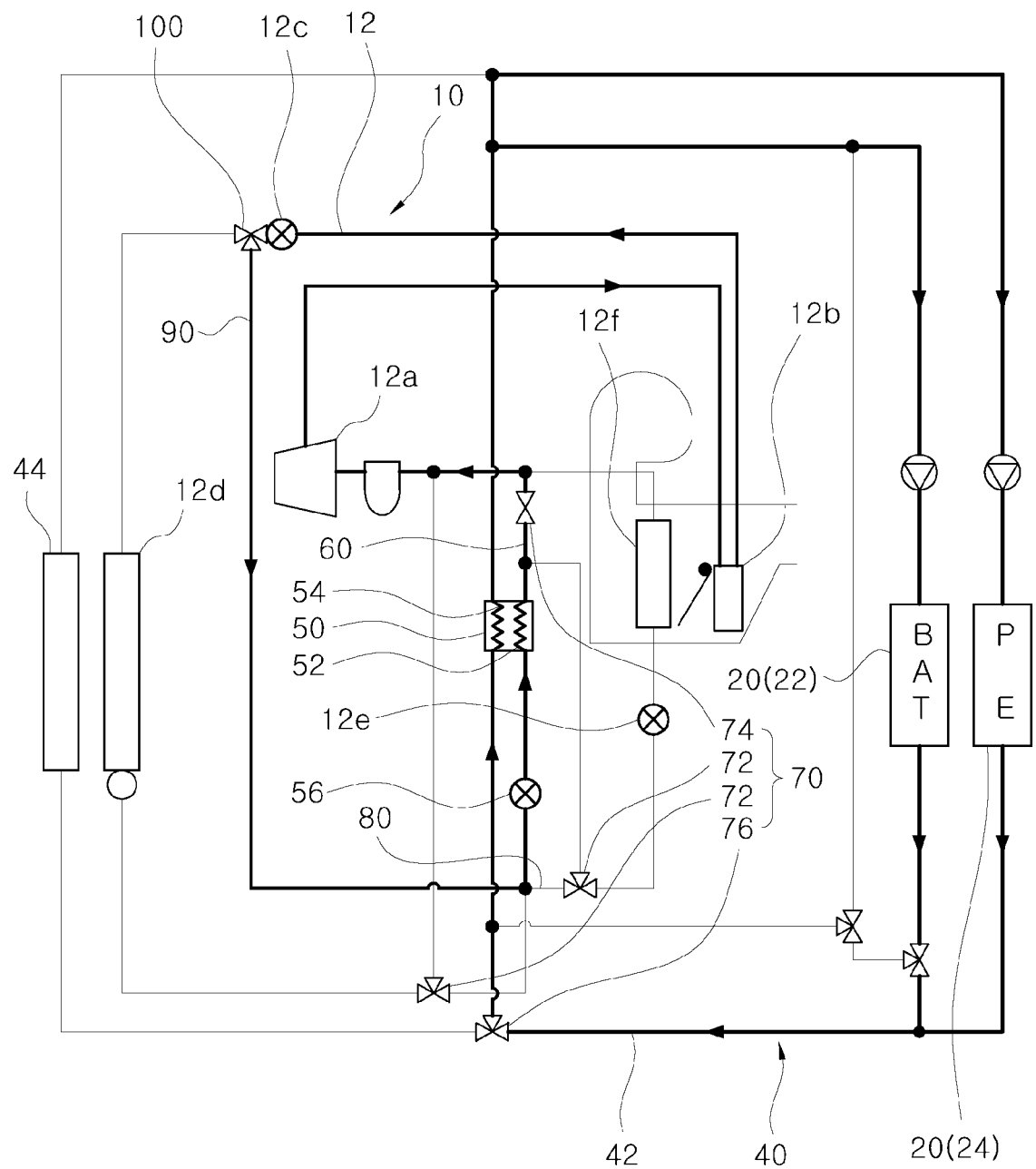
FIG. 9 is an operation diagram of the vehicular heat management system according to the present invention, showing the circulation of the refrigerant in the refrigerant circulation line and the circulation of the cooling water in the cooling water circulation line when entering an outdoor heat exchanger defrosting mode under a passenger compartment heating mode condition.

In addition, when entering the defrosting mode for the outdoor heat exchanger 12d under the passenger compartment heating mode condition, as shown in FIG. 9, the refrigerant-cooling water flow control part 70 allows the refrigerant depressurized and expanded by the heat pump mode variable expansion valve 12c to be introduced into the first internal flow path 52 of the refrigerant-cooling water chiller 50 without going through the outdoor heat exchanger 12d.

In addition, the refrigerant-cooling water flow control part 70 allows the cooling water in the cooling water circulation line 42 that has absorbed the waste heat of the battery 22 and the electric component module 24 to be circulated through the second internal flow path 54 of the refrigerant-cooling water chiller 50.

Therefore, when entering the defrosting mode for the outdoor heat exchanger 12d under the passenger compartment heating mode condition, the refrigerant circulation to the outdoor heat exchanger 12d can be limited to remove the frost on the surface of the outdoor heat exchanger 12d.

In addition, the refrigerant in the refrigerant circulation line 12 and the cooling water in the cooling water circulation line 42 can exchange heat with each other in the refrigerant-cooling water chiller 50. In the process of mutual heat exchange between the refrigerant and the cooling water, the refrigerant returning to the compressor 12a can recover the waste heat of the battery 22 and the electric component module 24, thereby enhancing the heat pump mode efficiency of the air conditioner 10.

Figure 10:
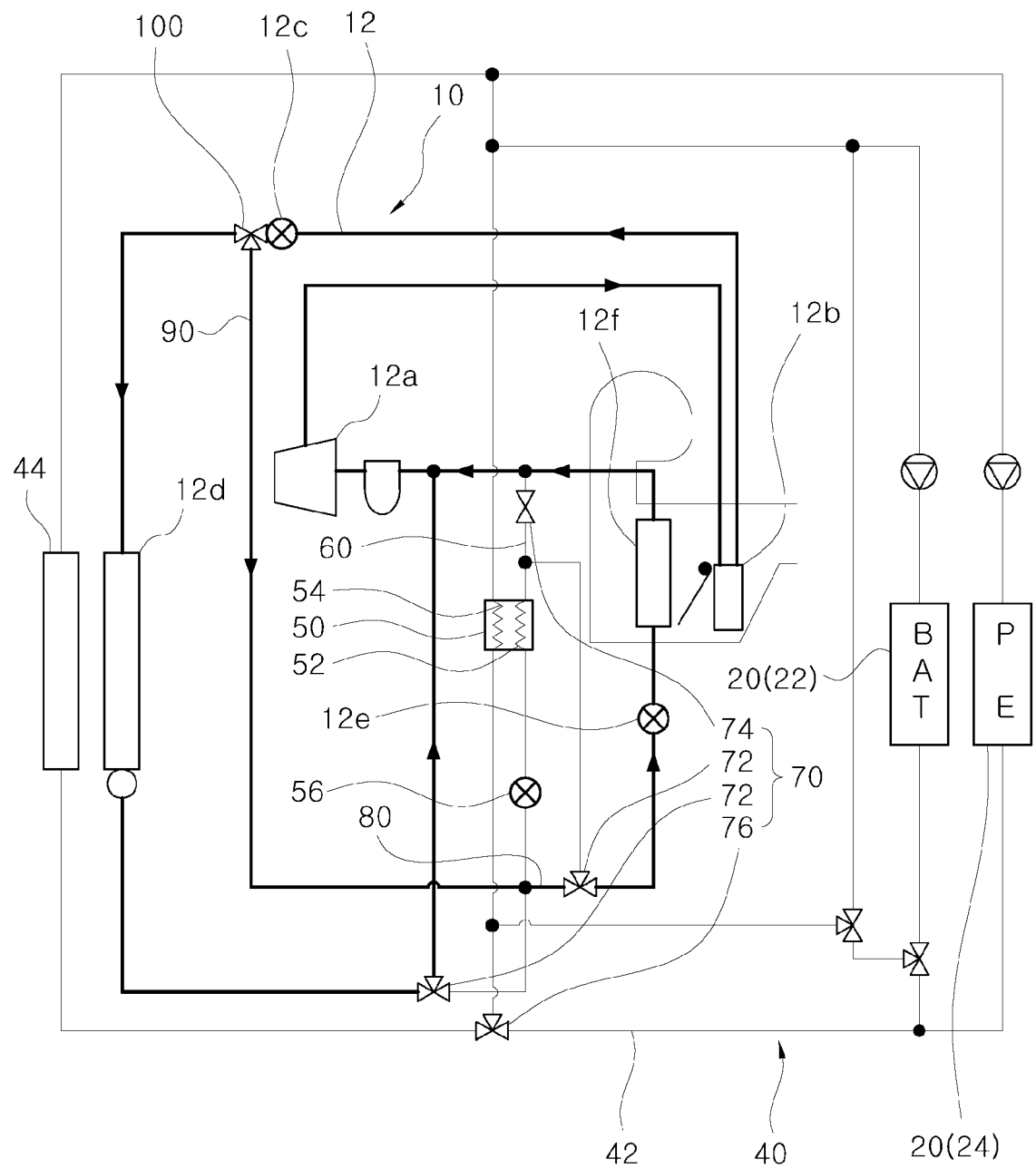
FIG. 10 is an operation diagram of the vehicular heat management system according to the present invention, showing the circulation of the refrigerant in the refrigerant circulation line when entering a passenger compartment dehumidifying mode under a passenger compartment heating mode condition.

In addition, when entering the passenger compartment dehumidifying mode in the vehicle under the passenger compartment heating mode condition, as shown in FIG. 10, the refrigerant-cooling water flow control part 70 allows the refrigerant depressurized and expanded by the heat pump mode variable expansion valve 12c to be introduced into both the outdoor heat exchanger 12d side and the low-pressure side indoor heat exchanger 12f.

Accordingly, hot air can be generated from the high-pressure side indoor heat exchanger 12b, and cold air can be generated from the low-pressure side indoor heat exchanger 12f.

Thus, it is possible to heat the passenger compartment using the hot air generated from the high-pressure side indoor heat exchanger 12b and dehumidify the passenger compartment using the cold air generated from the low-pressure side indoor heat exchanger 12f.

Figure 11:
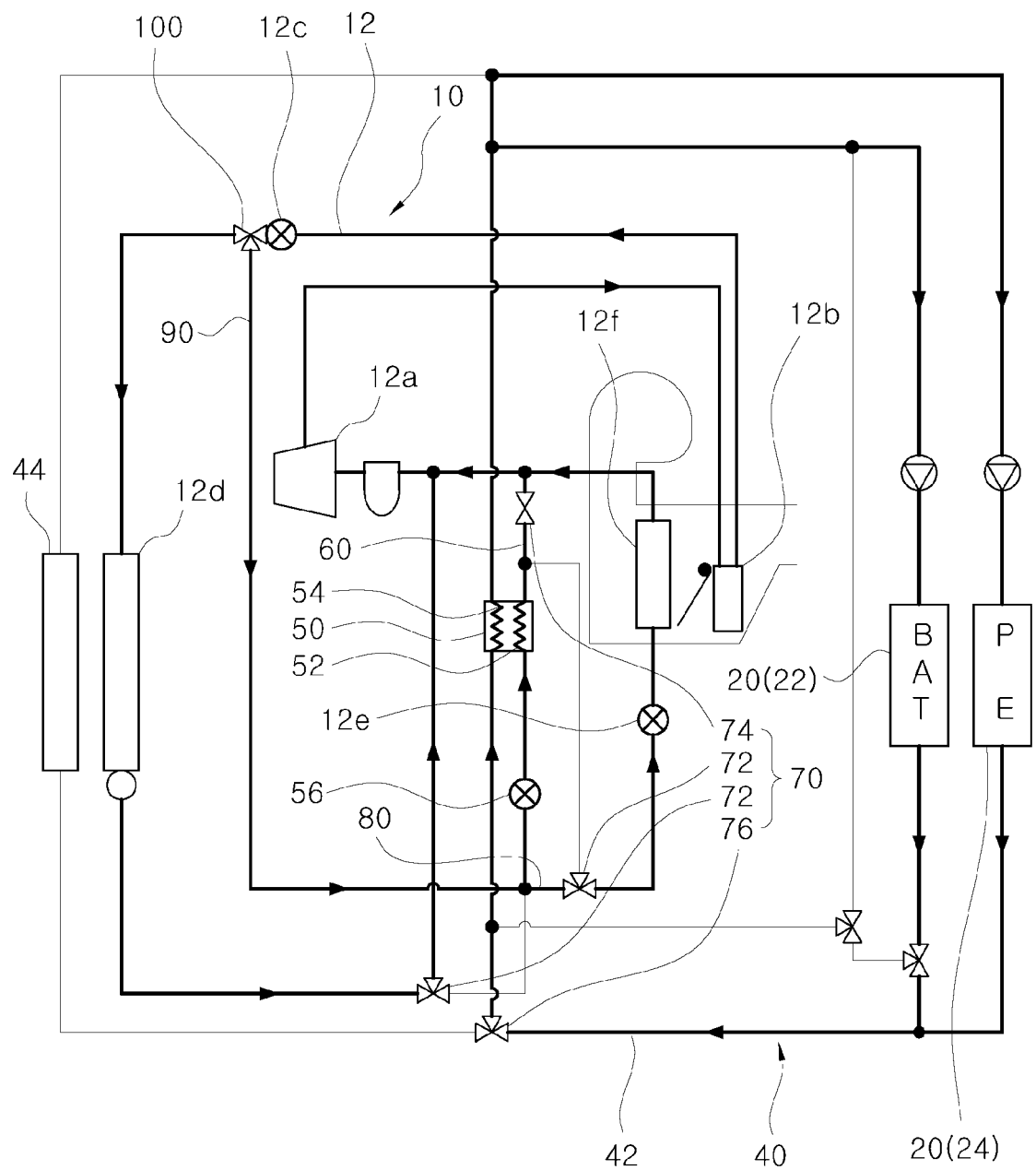
FIG. 11 is an operation diagram of the vehicular heat management system according to the present invention, showing the circulation of the refrigerant in the refrigerant circulation line and the circulation of the cooling water in the cooling water circulation line when entering a passenger compartment dehumidifying mode under a passenger compartment heating mode condition.

In addition, when entering the passenger compartment dehumidifying mode under the passenger compartment heating mode condition, as shown in FIG. 11, the refrigerant-cooling water flow control part 70 allows the refrigerant depressurized and expanded by the heat pump mode variable expansion valve 12c to be introduced into the outdoor heat exchanger 12d, the low-pressure side indoor heat exchanger 12f and the first internal flow path 52 of the refrigerant-cooling water chiller 50.

In addition, the cooling water in the cooling water circulation line 42 that has absorbed the waste heat of the battery 22 and the electric component module 24 is allowed to be circulated through the second internal flow path 54 of the refrigerant-cooling water chiller 50.

Therefore, in the passenger compartment dehumidifying mode under the passenger compartment heating mode condition, hot air is generated in the high-pressure side indoor heat exchanger 12b, and cold air is generated in the low-pressure side indoor heat exchanger 12f. The refrigerant in the refrigerant circulation line 12 and the cooling water in the cooling water circulation line 42 can exchange heat with each other in the refrigerant-cooling water chiller 50.

Accordingly, it is possible to heat the passenger compartment using the hot air generated from the high-pressure side indoor heat exchanger 12b and dehumidify the passenger compartment using the cold air generated from the low-pressure side indoor heat exchanger 12f. Through the heat exchange between the refrigerant and the cooling water, the refrigerant returning to the compressor 12a can recover the waste heat of the battery 22 and the electric component module 24, thereby enhancing the heat pump mode efficiency of the air conditioner 10.

Figure 12:
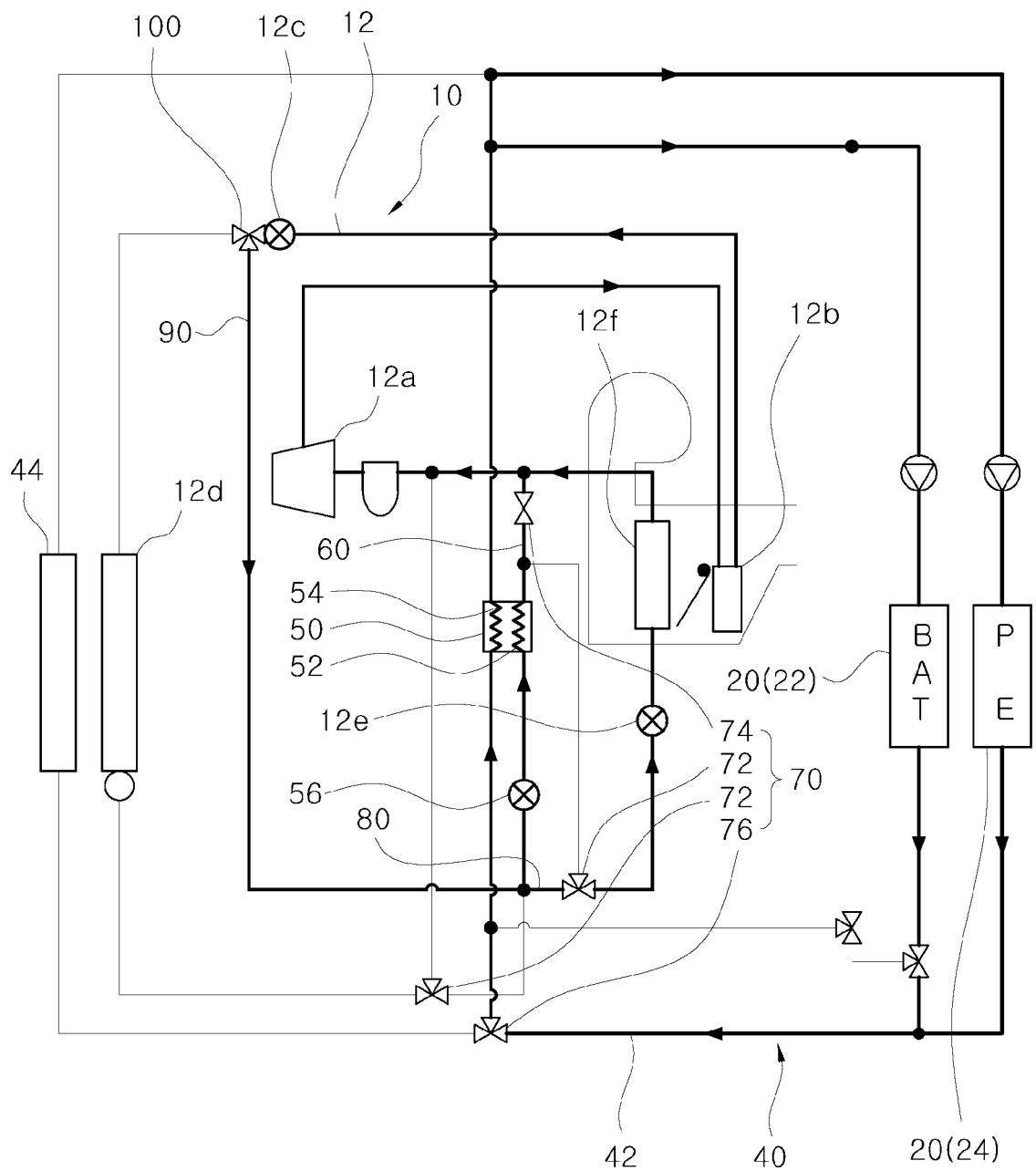
FIG. 12 is an operation diagram of the vehicular heat management system according to the present invention, showing the circulation of the refrigerant in the refrigerant circulation line and the circulation of the cooling water in the cooling water circulation line when entering both a passenger compartment dehumidifying mode and an outdoor heat exchanger defrosting mode.

In addition, when entering both the passenger compartment dehumidifying mode and the defrosting mode for the outdoor heat exchanger 12d, as shown in FIG. 12, the refrigerant-cooling water flow control part 70 allows the refrigerant depressurized and expanded by the heat pump mode variable expansion valve 12c to be introduced into both the first internal flow path 52 of the refrigerant-cooling water chiller 50 and the low-pressure side indoor heat exchanger 12f without going through the outdoor heat exchanger 12d.

In addition, the refrigerant in the cooling water circulation line 42 that has absorbed the waste heat of the battery 22 and the electric component module 24 is allowed to be circulated through the second internal flow path 54 of the refrigerant-cooling water chiller 50.

Therefore, when entering both the passenger compartment dehumidifying mode and the defrosting mode for the outdoor heat exchanger, the refrigerant circulation to the outdoor heat exchanger 12d can be limited, and cold air can be generated in the low-pressure side indoor heat exchanger 12f. The refrigerant in the refrigerant circulation line 12 and the cooling water in the cooling water circulation line 42 can exchange heat with each other in the refrigerant-cooling water chiller 50.

As a result, it is possible to remove the frost from the surface of the outdoor heat exchanger 12d by limiting the refrigerant circulation and to dehumidify the passenger compartment by using the cold air from the low-pressure side indoor heat exchanger 12f. In addition, by the heat exchange between the refrigerant and the cooling water in the refrigerant-cooling water chiller 50, the refrigerant returning to the compressor 12a recovers the waste heat of the battery 22 and the electric component module 24 to enhance the heat pump mode efficiency of the air conditioner 10.

Figure 13:
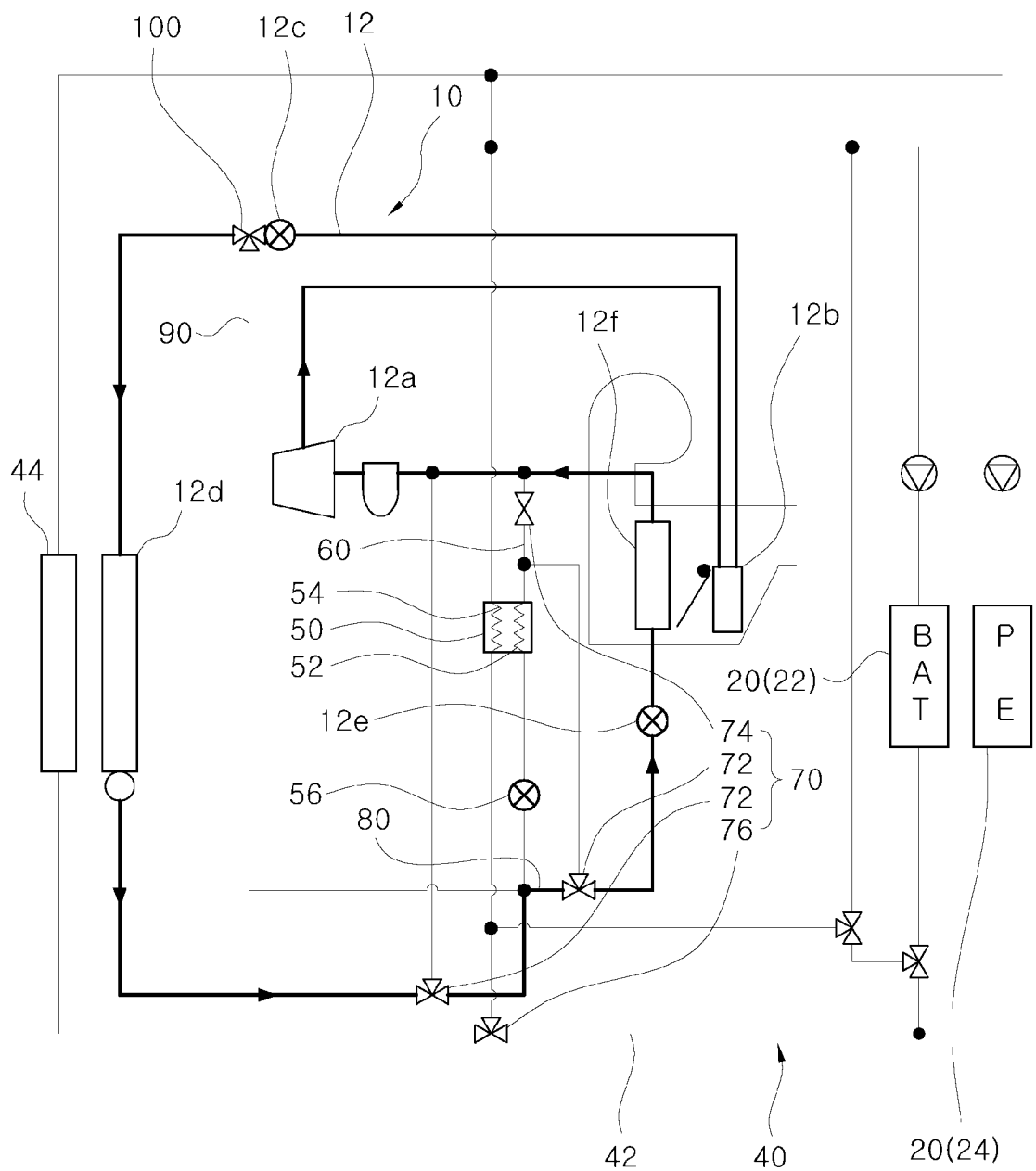
FIG. 13 is an operation diagram of the vehicular heat management system according to the present invention, showing the circulation of the refrigerant in the refrigerant circulation line when entering only a passenger compartment dehumidifying mode.

In addition, when entering only the passenger compartment dehumidifying mode, as shown in FIG. 13, the refrigerant-cooling water flow control part 70 allows the refrigerant depressurized and expanded by the heat pump mode variable expansion valve 12c to be sequentially introduced into the outdoor heat exchanger 12d and the low-pressure side indoor heat exchanger 12f.

Accordingly, when entering only the passenger compartment dehumidifying mode, cold air is generated in the low-pressure side indoor heat exchanger 12f. As a result, the passenger compartment can be dehumidified by the cold air from the low-pressure side indoor heat exchanger 12f.

When the refrigerant depressurized and expanded by the heat pump mode variable expansion valve 12c is sequentially introduced into the outdoor heat exchanger 12d and the low-pressure side indoor heat exchanger 12f, the refrigerant introduced into the low-pressure side indoor heat exchanger 12f is depressurized and expanded twice while sequentially passing through the heat pump mode variable expansion valve 12c and the air conditioner mode variable expansion valve 12e.

Accordingly, the refrigerant that has been depressurized and expanded twice improves the cooling performance of the low-pressure side indoor heat exchanger 12f, thereby enhancing the passenger compartment dehumidification efficiency.

Figure 14:
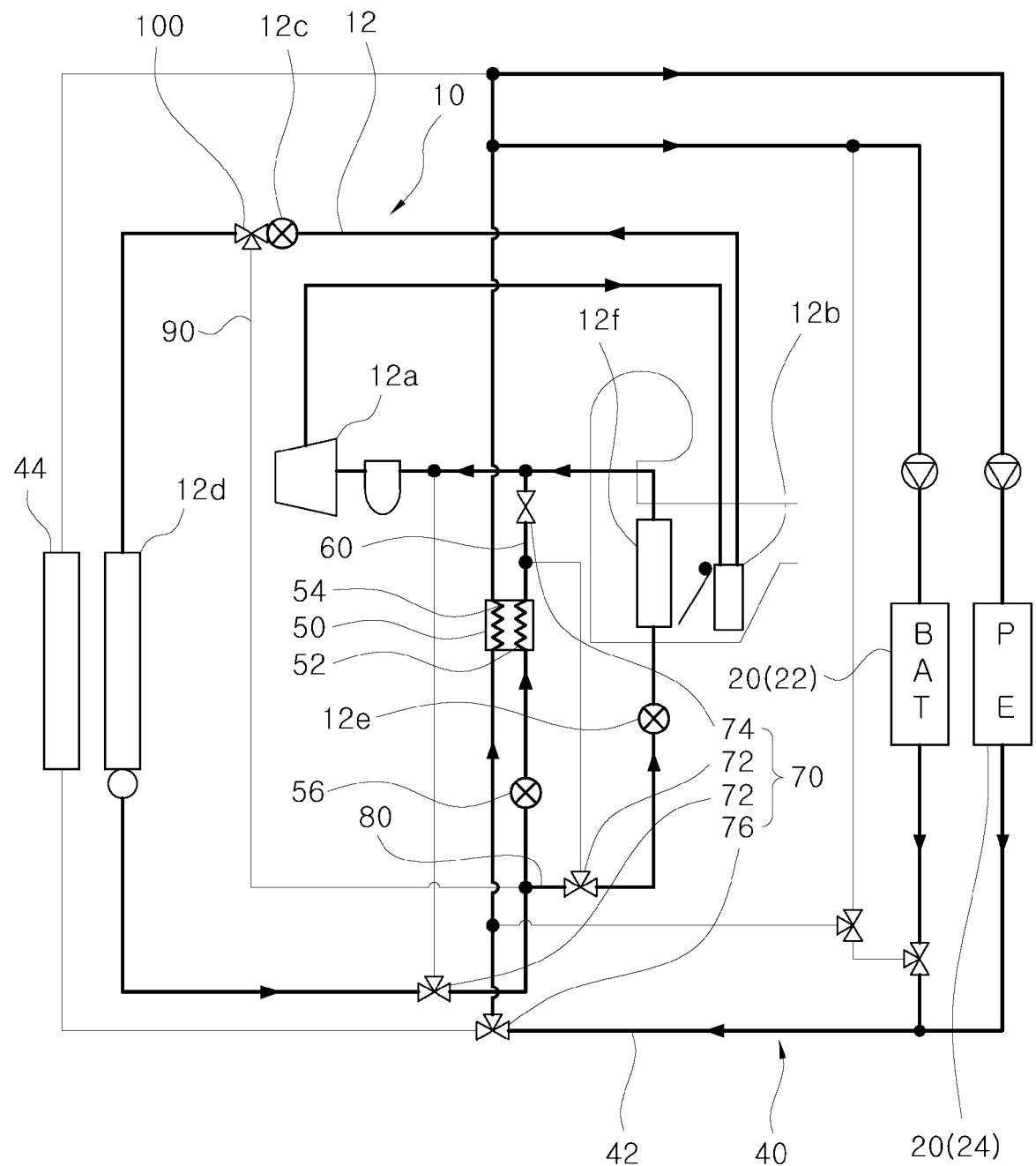
FIG. 14 is an operation diagram of the vehicular heat management system according to the present invention, showing the circulation of the refrigerant in the refrigerant circulation line and the circulation of the cooling water in the cooling water circulation line when entering a battery/electric component module cooling mode under a passenger compartment dehumidifying mode condition.

In addition, when entering the cooling mode for the specific cooling target 20 under the passenger compartment dehumidifying mode condition, as shown in FIG. 14, the refrigerant-cooling water flow control part 70 allows the refrigerant depressurized and expanded by the heat pump mode variable expansion valve 12c to pass through the outdoor heat exchanger 12d and then to be introduced into both the first internal flow path 52 of the refrigerant-cooling water chiller 50 and the low-pressure side indoor heat exchanger 12f.

In addition, the refrigerant in the cooling water circulation line 42 that has absorbed the waste heat of the battery 22 and the electric component module 24 is allowed to be circulated through the second internal flow path 54 of the refrigerant-cooling water chiller 50.

Accordingly, when entering the cooling mode for the specific cooling target 20 under the passenger compartment dehumidifying mode condition, a cold air is generated in the low-pressure side indoor heat exchanger 12. The refrigerant in the refrigerant circulation line 12 and the cooling water in the cooling water circulation line 42 are allowed to exchange heat with each other in the refrigerant-cooling water chiller 50.

Accordingly, it is possible to dehumidify the passenger compartment through the use of the cold air from the low-pressure side indoor heat exchanger 12f. In addition, the heat exchange between the refrigerant and the cooling water in the refrigerant-cooling water chiller 50 allows the cooling water circulated through the specific cooling target 20 to cool the specific cooling target 20 while maintaining a low temperature.

According to the vehicular heat management system of the present invention having such a configuration, in the passenger compartment cooling mode, the high-temperature refrigerant in the refrigerant circulation line 12 introduced into the low-pressure side indoor heat exchanger 12f and the low-temperature cooling water in the cooling water circulation line 42 are allowed to exchange heat with each other in the refrigerant-cooling water chiller 50. Therefore, in the passenger compartment cooling mode, the temperature of the refrigerant introduced into the low-pressure side indoor heat exchanger 12f can be further lowered to thereby improve the cooling efficiency of the low-pressure side indoor heat exchanger 12f.

In addition, in the passenger compartment heating mode, the low-temperature refrigerant in the refrigerant circulation line 12 introduced into the compressor 12a and the cooling water in the cooling water circulation line 42 that has absorbed the waste heat the battery 22 and the electric component module 24 are allowed to exchange heat with each other in the refrigerant-cooling water chiller 50. Therefore, in the passenger compartment heating mode, the refrigerant introduced into the compressor 12a can recover the waste heat of the battery 22 and the electric component module 24. This makes it possible to improve the refrigerant compression efficiency at the compressor 12a and to improve the heat pump mode efficiency.

In addition, the cooling efficiency of the low-pressure side indoor heat exchanger 12f and the heat pump mode efficiency are improved by the effective heat energy management for the refrigerant and the cooling water through the refrigerant-cooling water chiller 50. Therefore, it is possible to improve the passenger compartment cooling/heating performance without additional energy consumption.

In addition, by adopting the configuration capable of improving the passenger compartment cooling/heating performance without energy consumption, it is possible to improve both the passenger compartment cooling/heating performance and improve the fuel efficiency of the vehicle.

While the preferred embodiments of the present invention have been described above, the present invention is not limited to the above-described embodiments. Various modifications and changes may be made without departing from the scope and spirit of the present invention defined in the claims.

What is claimed is:

1. A vehicular heat management system, comprising:
   a heat pump type refrigerant circulation line including a compressor, a high-pressure side indoor heat exchanger, a heat pump mode variable expansion valve, an outdoor heat exchanger, an air conditioner mode variable expansion valve, and a low-pressure side indoor heat exchanger;
   a cooling water circulation line configured to circulate cooling water between a radiator and a specific cooling target;
   a refrigerant-cooling water chiller configured to allow the refrigerant in the refrigerant circulation line transferred from the outdoor heat exchanger to the low-pressure side indoor heat exchanger to exchange heat with the cooling water in the cooling water circulation line circulated through the specific cooling target; and
   a refrigerant-cooling water flow control part configured to, depending on an air conditioner mode state, control a flow of the refrigerant in the refrigerant circulation line and a flow of the cooling water in the cooling water circulation line with respect to the refrigerant-cooling water chiller,
   wherein the refrigerant-cooling water flow control part is configured to, when the waste heat temperature of the specific cooling target is lower than a preset temperature in the passenger compartment heating mode, allow the refrigerant in the refrigerant circulation line discharged from the outdoor heat exchanger to be introduced into the compressor and allow the cooling water in the cooling water circulation line circulated through the specific cooling target to circulate toward the radiator.

2. The system of claim 1, wherein the refrigerant-cooling water chiller is configured to, in a passenger compartment cooling mode, allow the refrigerant in the refrigerant circulation line introduced from the outdoor heat exchanger into the low-pressure side indoor heat exchanger to exchange heat with the cooling water in the cooling water circulation line having a lower temperature than the refrigerant to additionally lower the temperature of the refrigerant introduced into the low-pressure side indoor heat exchanger.

3. The system of claim 2, further comprising:
   a variable expansion valve installed on the upstream side of the refrigerant-cooling water chiller,
   wherein the variable expansion valve is configured to, when the temperature of the specific cooling target is increased to a preset temperature or more in the passenger compartment cooling mode, depressurize and expand the refrigerant introduced into the refrigerant-cooling water chiller, so that a low-temperature cold air is generated in the refrigerant-cooling water chiller and is delivered to the specific cooling target through the cooling water in the cooling water circulation line to cool the specific cooling target.

4. The system of claim 3, further comprising:
   a bypass line and a bypass valve configured to, in a passenger compartment heating mode, directly bypass the refrigerant in the refrigerant circulation line discharged from the refrigerant- cooling water chiller toward an inlet of the compressor,
   wherein the refrigerant-cooling water chiller is configured to, in the passenger compartment heating mode, allow the refrigerant in the refrigerant circulation line introduced into the compressor through the bypass line and the bypass valve to exchange heat with the cooling water in the cooling water circulation line that has adsorbed waste heat of the specific cooling target, so that the refrigerant in the refrigerant circulation line introduced into the compressor recovers the waste heat of the specific cooling target.

5. The system of claim 1, wherein the refrigerant-cooling water flow control part includes a plurality of refrigerant circulation line side flow control valves installed in the refrigerant circulation line on the upstream side of the refrigerant-cooling water chiller with the refrigerant-cooling water chiller interposed therebetween, the bypass valve installed on the bypass line, and a cooling water circulation line side flow control valve installed in the cooling water circulation line on the downstream side of the specific cooling target.

6. The system of claim 5, wherein the refrigerant-cooling water flow control part is configured to, in the passenger compartment cooling mode, allow the refrigerant in the refrigerant circulation line discharged from the outdoor heat exchanger to be introduced into the low-pressure side indoor heat exchanger through the refrigerant-cooling water chiller and allow the cooling water in the cooling water circulation line circulated through the specific cooling target to circulate toward the refrigerant-cooling water chiller, so that, in the passenger compartment cooling mode, the refrigerant in the refrigerant circulation line introduced into the low-pressure side indoor heat exchanger and the cooling water in the cooling water circulation line circulated through the specific cooling target are allowed to exchange heat with each other in the refrigerant- cooling water chiller.

7. The system of claim 6, wherein the refrigerant-cooling water flow control part is configured to, in the passenger compartment heating mode, allow the refrigerant in the refrigerant circulation line discharged from the outdoor heat exchanger to be bypassed toward the compressor through the refrigerant-cooling water chiller and allow the cooling water in the cooling water circulation line that has absorbed the waste heat of the specific cooling target to circulate toward the refrigerant-cooling water chiller, so that, in the passenger compartment heating mode, the refrigerant in the refrigerant circulation line introduced into the compressor and the cooling water in the cooling water circulation line that has absorbed the waste heat of the specific cooling target are allowed to exchange heat with each other in the refrigerant-cooling water chiller.

8. The system of claim 1, wherein the refrigerant-cooling water flow control part is configured to, when entering only a specific cooling target cooling mode, allow the refrigerant in the refrigerant circulation line discharged from the outdoor heat exchanger to be bypassed toward the compressor through the refrigerant-cooling water chiller and allow the cooling water in the cooling water circulation line that has absorbed the waste heat of the specific cooling target to circulate toward the refrigerant-cooling water chiller, so that, when entering only the specific cooling target cooling mode, the low-temperature refrigerant in the refrigerant circulation line introduced into the compressor and the cooling water in the cooling water circulation line that has absorbed the waste heat of the specific cooling target are allowed to exchange heat with each other in the refrigerant-cooling water chiller to dissipate the waste heat of the specific cooling target.

9. The system of claim 8, wherein the refrigerant-cooling water flow control part is configured to, when entering the specific cooling target cooling mode under the passenger compartment cooling mode condition, allow the refrigerant in the refrigerant circulation line discharged from the outdoor heat exchanger to be introduced into the refrigerant-cooling water chiller and the low-pressure side indoor heat exchanger and allow the cooling water in the cooling water circulation line that has absorbed the waste heat of specific cooling target to circulate toward the refrigerant-cooling water chiller, so that when entering the specific cooling target cooling mode under the passenger compartment cooling mode condition, cold air is generated in the low-pressure side indoor heat exchanger to cool the passenger compartment, and the low-temperature refrigerant in the refrigerant circulation line introduced into the compressor and the cooling water in the cooling water circulation line that has absorbed the waste heat of the specific cooling target are allowed to exchange heat with each other in the refrigerant-cooling water chiller to dissipate the waste heat of the specific cooling target.

10. The system of claim 9, wherein the refrigerant-cooling water flow control part further includes a three-way flow control valve installed in the refrigerant circulation line on the downstream side of the heat pump mode variable expansion valve, and the three-way flow control valve is configured to, depending on an air conditioner mode, cooperate with the refrigerant circulation line side flow control valves and the bypass valve to introduce the refrigerant depressurized and expanded by the heat pump mode variable expansion valve into at least one of the outdoor heat exchanger, the refrigerant-cooling water chiller and the low-pressure side indoor heat exchanger.

11. The system of claim 10, wherein the refrigerant-cooling water flow control part is configured to, in the passenger compartment heating mode, allow the refrigerant depressurized and expanded by the heat pump mode variable expansion valve to be introduced into both the outdoor heat exchanger and the refrigerant-cooling water chiller and returned to the compressor and allow the cooling water in the cooling water circulation line that has absorbed the waste heat of the specific cooling target to circulate toward the refrigerant-cooling water chiller, so that, in the passenger compartment heating mode, the refrigerant depressurized and expanded by the heat pump mode variable expansion valve is directly introduced into the compressor through the outdoor heat exchanger, and the refrigerant in the refrigerant circulation line introduced into the compressor and the cooling water in the cooling water circulation line that has absorbed the waste heat of the specific cooling target are allowed to exchange heat with each other in the refrigerant-cooling water chiller.

12. The system of claim 11, wherein the refrigerant-cooling water flow control part is configured to, when entering an outdoor heat exchanger defrosting mode under the passenger compartment heating mode condition, allow the refrigerant depressurized and expanded by the heat pump mode variable expansion valve to be introduced into the refrigerant-cooling water chiller without going through the outdoor heat exchanger and returned to the compressor and allow the cooling water in the cooling water circulation line that has absorbed the waste heat of the specific cooling target to circulate toward the refrigerant-cooling water chiller, so that, when entering the outdoor heat exchanger defrosting mode under the passenger compartment heating mode condition, the circulation of the refrigerant toward the outdoor heat exchanger is limited to remove a frost on the surface of the outdoor heat exchanger, and the refrigerant in the refrigerant circulation line introduced into the compressor and the cooling water in the cooling water circulation line that has absorbed the waste heat of the specific cooling target are allowed to exchange heat with each other in the refrigerant-cooling water chiller.

13. The system of claim 12, wherein the refrigerant-cooling water flow control part is configured to, when entering a passenger compartment dehumidifying mode under the passenger compartment heating mode condition, allow the refrigerant depressurized and expanded by the heat pump mode variable expansion valve to be introduced into the outdoor heat exchanger and the low-pressure side indoor heat exchanger, so that, when entering the passenger compartment dehumidifying mode under the passenger compartment heating mode condition, hot air is generated in the high-pressure side indoor heat exchanger and cold air is generated in the low-pressure side indoor heat exchanger to heat and dehumidify a passenger compartment.

14. The system of claim 13, wherein the refrigerant-cooling water flow control part is configured to, when entering the passenger compartment dehumidifying mode under the passenger compartment heating mode condition, allow the refrigerant depressurized and expanded by the heat pump mode variable expansion valve to be introduced into the outdoor heat exchanger, the low-pressure side indoor heat exchanger and the refrigerant-cooling water chiller and returned to the compressor and allow the cooling water in the cooling water circulation line that has absorbed the waste heat of the specific cooling target to circulate toward the refrigerant-cooling water chiller, so that, when entering the passenger compartment dehumidifying mode under the passenger compartment heating mode condition, hot air is generated in the high-pressure side indoor heat exchanger and cold air is generated in the low-pressure side indoor heat exchanger to heat and dehumidify the passenger compartment, and the refrigerant in the refrigerant circulation line introduced into the compressor and the cooling water in the cooling water circulation line that has absorbed the waste heat of the specific cooling target are allowed to exchange heat with each other in the refrigerant-cooling water chiller.

15. The system of claim 14, wherein the refrigerant-cooling water flow control part is configured to, when entering both the passenger compartment dehumidifying mode and the outdoor heat exchanger defrosting mode, allow the refrigerant depressurized and expanded by the heat pump mode variable expansion valve to be introduced into the refrigerant-cooling water chiller and the low-pressure side indoor heat exchanger without going through the outdoor heat exchanger and returned to the compressor and allow the cooling water in the cooling water circulation line that has absorbed the waste heat of the specific cooling target to circulate toward the refrigerant-cooling water chiller, so that, when entering both the passenger compartment dehumidifying mode and the outdoor heat exchanger defrosting mode, the circulation of the refrigerant toward the outdoor heat exchanger is limited and the cold air is generated in the low-pressure side indoor heat exchanger to remove a frost on the surface of the outdoor heat exchanger and dehumidify the passenger compartment, and the refrigerant in the refrigerant circulation line introduced into the compressor and the cooling water in the cooling water circulation line that has absorbed the waste heat of the specific cooling target are allowed to exchange heat with each other in the refrigerant-cooling water chiller.

16. The system of claim 15, wherein the refrigerant-cooling water flow control part is configured to, when entering only the passenger compartment dehumidifying mode, allow the refrigerant depressurized and expanded by the heat pump mode variable expansion valve to be sequentially introduced into the outdoor heat exchanger and the low-pressure side indoor heat exchanger, so that, when entering only the passenger compartment dehumidifying mode, the cold air is generated in the low-pressure side indoor heat exchanger to dehumidify the passenger compartment.

17. The system of claim 16, wherein the refrigerant-cooling water flow control part is configured to, when entering the specific cooling target cooling mode under the passenger compartment dehumidifying mode condition, allow the refrigerant depressurized and expanded by the heat pump mode variable expansion valve to be introduced into both the refrigerant-cooling water chiller and the low-pressure side indoor heat exchanger after passing through the outdoor heat exchanger and returned to the compressor and allow the cooling water in the cooling water circulation line that has absorbed the waste heat of the specific cooling target to circulate toward the refrigerant-cooling water chiller, so that, when entering the specific cooling target cooling mode under the passenger compartment dehumidifying mode condition, the cold air is generated in the low-pressure side indoor heat exchanger to dehumidify the passenger compartment, and the refrigerant in the refrigerant circulation line introduced into the compressor and the cooling water in the cooling water circulation line that has absorbed the waste heat of the specific cooling target are allowed to exchange heat with each other in the refrigerant-cooling water chiller to dissipate the waste heat of the specific cooling target.

\* \* \* \* \*